United States Patent
Katano et al.

(10) Patent No.: US 9,311,031 B2
(45) Date of Patent: Apr. 12, 2016

(54) APPROACH FOR PRINTING POLICY-ENABLED ELECTRONIC DOCUMENTS USING LOCKED PRINTING AND A SHARED MEMORY DATA STRUCTURE

(75) Inventors: Seiichi Katano, Cupertino, CA (US); Jayasimha Nuggehalli, Cupertino, CA (US); Seong Kim, Saratoga, CA (US)

(73) Assignee: Ricoh Company, Ltd., Tokyo (JP)

( * ) Notice: Subject to any disclaimer, the term of this patent is extended or adjusted under 35 U.S.C. 154(b) by 2454 days.

(21) Appl. No.: 12/059,986

(22) Filed: Mar. 31, 2008

(65) Prior Publication Data
US 2009/0244596 A1    Oct. 1, 2009

(51) Int. Cl.
G06F 15/00    (2006.01)
G06F 3/12    (2006.01)
G06F 21/60    (2013.01)

(52) U.S. Cl.
CPC ............ G06F 3/1238 (2013.01); G06F 3/1222 (2013.01); G06F 3/1288 (2013.01); G06F 21/608 (2013.01)

(58) Field of Classification Search
USPC ....................................................... 358/1.14
See application file for complete search history.

(56) References Cited

U.S. PATENT DOCUMENTS

| | | | |
|---|---|---|---|
| 5,113,355 A | 5/1992 | Nomura | |
| 5,880,447 A | 3/1999 | Okada et al. | |
| 5,970,218 A | 10/1999 | Mullin et al. | |
| 6,161,139 A | 12/2000 | Win et al. | |
| 6,614,546 B1 | 9/2003 | Kurozasa | |
| 6,862,583 B1 | 3/2005 | Mazzagatte et al. | |
| 6,938,154 B1 | 8/2005 | Berson et al. | |
| 6,965,449 B2 | 11/2005 | Sugiyama | |
| 6,970,259 B1 | 11/2005 | Lunt et al. | |

(Continued)

FOREIGN PATENT DOCUMENTS

| | | |
|---|---|---|
| EP | 0657 845 A2 | 11/1994 |
| EP | 1 091 275 | 4/2001 |

(Continued)

OTHER PUBLICATIONS

European Patent Office, "European Search Report", European patent application EP 08 16 0705, dated Nov. 12, 2008, 10 pages.

(Continued)

*Primary Examiner* — Mark Milia
(74) *Attorney, Agent, or Firm* — Hickman Palermo Becker Bingham LLP; Edward A. Becker

(57) ABSTRACT

According to approach for printing policy-enabled electronic documents, when a locked print module determines that an electronic document contained in the PDF print data is a policy-enabled electronic document, the locked print module causes the PDF print data to be stored on the printing device and not immediately processed for printing. A PDF-to-postscript conversion module generates and stores in a common data structure in the shared memory a request for security data for the PDF print data. A policy client module retrieves the request from the common data structure in the shared memory, obtains security data for the PDF print data from a policy server, and stores the security data in the common data structure in the shared memory. The PDF-to-postscript conversion module uses the security data to decrypt the PDF print data and then converts the decrypted PDF print data into postscript data for printing by the printing device.

24 Claims, 6 Drawing Sheets

(56) References Cited

U.S. PATENT DOCUMENTS

| | | | |
|---|---|---|---|
| 7,002,703 B2 | 2/2006 | Parry | |
| 7,079,269 B2 | 7/2006 | Teeuwen et al. | |
| 7,110,541 B1 | 9/2006 | Lunt et al. | |
| 7,136,176 B2 | 11/2006 | Sugiyama | |
| 7,170,623 B2 | 1/2007 | Matoba et al. | |
| 7,271,925 B2 | 9/2007 | Nishiyama | |
| 7,313,699 B2 | 12/2007 | Koga | |
| 7,359,076 B2 | 4/2008 | Uchino | |
| 7,382,487 B2 | 6/2008 | Ikegami | |
| 7,450,260 B2 | 11/2008 | Takeda et al. | |
| 7,609,412 B2 | 10/2009 | Maruyama | |
| 7,660,803 B2 | 2/2010 | Jin | |
| 7,667,865 B2 | 2/2010 | Ciriza et al. | |
| 7,697,760 B2 | 4/2010 | Kwok et al. | |
| 8,130,392 B2 | 3/2012 | Kato | |
| 8,302,205 B2 | 10/2012 | Kanai | |
| 8,363,243 B2 | 1/2013 | Nuggehalli | |
| 2001/0029521 A1 | 10/2001 | Matsuda et al. | |
| 2001/0038462 A1 | 11/2001 | Teeuwen et al. | |
| 2002/0023143 A1 | 2/2002 | Stephenson et al. | |
| 2002/0097431 A1 | 7/2002 | Ikegami | |
| 2002/0120855 A1 | 8/2002 | Wiley et al. | |
| 2003/0065404 A1 | 4/2003 | Bhatti | |
| 2003/0090696 A1 | 5/2003 | Willis et al. | |
| 2003/0090697 A1 | 5/2003 | Lester et al. | |
| 2004/0088378 A1 | 5/2004 | Moats | |
| 2004/0117389 A1 | 6/2004 | Enami et al. | |
| 2004/0118911 A1 | 6/2004 | Black et al. | |
| 2004/0125402 A1 | 7/2004 | Kanai | |
| 2004/0140611 A1 | 7/2004 | Mui et al. | |
| 2004/0156068 A1 | 8/2004 | Yoshida et al. | |
| 2004/0165216 A1 | 8/2004 | Nauta | |
| 2004/0169884 A1 | 9/2004 | Yamada | |
| 2004/0196492 A1 | 10/2004 | Johnson et al. | |
| 2004/0246515 A1 | 12/2004 | Patton et al. | |
| 2004/0257601 A1 | 12/2004 | Tomiyasu et al. | |
| 2004/0263870 A1* | 12/2004 | Itoh et al. | 358/1.1 |
| 2005/0094195 A1 | 5/2005 | Sakamoto et al. | |
| 2005/0100378 A1* | 5/2005 | Kimura et al. | 400/76 |
| 2005/0141013 A1 | 6/2005 | Kikuchi et al. | |
| 2005/0183141 A1 | 8/2005 | Sawada | |
| 2005/0254086 A1 | 11/2005 | Shouno | |
| 2005/0276618 A1 | 12/2005 | Clement et al. | |
| 2006/0017954 A1 | 1/2006 | Ly et al. | |
| 2006/0028672 A1 | 2/2006 | Abiko | |
| 2006/0044607 A1 | 3/2006 | Kato | |
| 2006/0074840 A1 | 4/2006 | Gava | |
| 2006/0112021 A1 | 5/2006 | Maki | |
| 2006/0170947 A1 | 8/2006 | Kurabayashi | |
| 2006/0244998 A1 | 11/2006 | Salgado | |
| 2006/0268287 A1 | 11/2006 | Robinson | |
| 2006/0285141 A1 | 12/2006 | Kim et al. | |
| 2007/0019224 A1 | 1/2007 | Okada et al. | |
| 2007/0022467 A1 | 1/2007 | Filbrich | |
| 2007/0091360 A1 | 4/2007 | Lizuka | |
| 2007/0127055 A1 | 6/2007 | Kujirai et al. | |
| 2007/0133044 A1 | 6/2007 | Tanaka | |
| 2007/0146768 A1 | 6/2007 | Isoda | |
| 2007/0234400 A1 | 10/2007 | Yanagi | |
| 2007/0247660 A1 | 10/2007 | Nuggehalli | |
| 2007/0273925 A1 | 11/2007 | Hong | |
| 2007/0279671 A1 | 12/2007 | Shouno | |
| 2008/0002225 A1 | 1/2008 | Iwasaki | |
| 2008/0037052 A1 | 2/2008 | Nishiguchi | |
| 2008/0066185 A1 | 3/2008 | Lester et al. | |
| 2008/0114922 A1 | 5/2008 | Chou et al. | |
| 2008/0117452 A1 | 5/2008 | Murakami | |
| 2008/0180723 A1 | 7/2008 | Selvaraj | |
| 2008/0259380 A1 | 10/2008 | Nuggehalli | |
| 2009/0086252 A1 | 4/2009 | Zucker et al. | |
| 2009/0097059 A1 | 4/2009 | IIJima | |
| 2009/0207439 A1 | 8/2009 | Oomura | |
| 2009/0244594 A1 | 10/2009 | Nuggehalli et al. | |
| 2009/0244595 A1 | 10/2009 | Kim | |
| 2009/0316181 A1 | 12/2009 | Shoji et al. | |
| 2010/0002248 A1 | 1/2010 | Nuggehalli et al. | |
| 2010/0002249 A1 | 1/2010 | Nuggehalli et al. | |
| 2010/0014110 A1 | 1/2010 | Munetomo | |
| 2010/0333183 A1 | 12/2010 | Yago | |
| 2011/0013219 A1 | 1/2011 | Nuggehalli et al. | |
| 2011/0107396 A1 | 5/2011 | Ozaki | |
| 2012/0127504 A1 | 5/2012 | Nuggehalli et al. | |
| 2012/0140264 A1 | 6/2012 | Nuggehalli | |
| 2013/0083363 A1 | 4/2013 | Kim | |
| 2013/0169991 A1 | 7/2013 | Nuggehalli | |

FOREIGN PATENT DOCUMENTS

| | | |
|---|---|---|
| EP | 1 091 275 A2 | 4/2001 |
| EP | 1 143 695 | 10/2001 |
| EP | 1 143 695 A2 | 10/2001 |
| EP | 1 229 724 | 8/2002 |
| EP | 1 229 724 A2 | 8/2002 |
| EP | 1229724 | 8/2002 |
| EP | 1229724 A2 | 8/2002 |
| EP | 1 367 814 | 12/2003 |
| EP | 1 465 052 A2 | 10/2004 |
| EP | 1 566 719 A2 | 2/2005 |
| EP | 1 511 287 | 3/2005 |
| EP | 1 621 994 | 2/2006 |
| EP | 1621994 A1 | 2/2006 |
| JP | 6152814 A | 5/1994 |
| JP | 11-191043 | 7/1999 |
| JP | 2001067201 A | 3/2001 |
| JP | 2001125982 A | 5/2001 |
| JP | 2001217948 A | 8/2001 |
| JP | 2002007095 A | 1/2002 |
| JP | 2002199153 A | 7/2002 |
| JP | 2002-312146 | 10/2002 |
| JP | 2004181647 A | 7/2004 |
| JP | 2004-221979 | 8/2004 |
| JP | 2005178070 A | 7/2005 |
| JP | 2005196741 A | 7/2005 |
| JP | 2005-225099 | 8/2005 |
| JP | 2006205374 A | 8/2006 |
| JP | 2006227908 A | 8/2006 |
| JP | 2006231675 A | 9/2006 |
| JP | 2006252142 A | 9/2006 |
| JP | 2006260245 A | 9/2006 |
| JP | 2006297624 A | 11/2006 |
| JP | 2006-341404 | 12/2006 |
| JP | 2007055022 A | 3/2007 |
| JP | 2007087305 A | 4/2007 |
| JP | 2007-140916 | 7/2007 |
| JP | 2007-176082 | 7/2007 |
| JP | 2007188477 A | 7/2007 |
| JP | 2007203736 A | 8/2007 |
| JP | 2007-241939 | 9/2007 |
| JP | 2007-304931 | 11/2007 |
| JP | 2007290396 A | 11/2007 |
| JP | 2008-040981 | 2/2008 |
| JP | 2008097075 A | 4/2008 |
| JP | 2008102783 A | 5/2008 |
| JP | 2008103867 A | 5/2008 |
| WO | WO 00/68817 | 11/2000 |
| WO | WO 00/68817 A | 11/2000 |

OTHER PUBLICATIONS

European Patent Office, "European Search Report", EP application No. EP 07252112, dated Mar. 1, 2010, 6 pages.

U.S. Appl. No. 11/439,796, filed May 23, 2006, Office Action, Jan. 15, 2010.

European Patent Office, "European Search Report", Application No. 07121257.5-1228, dated Mar. 31, 2008, 6 pages.

Claims, Application No. 07121257.5-1228, 9 pages.

European Patent Office, "European Search Report", application No. EP 09156641, dated Jul. 2, 2009, 8 pages.

Claims, European patent application 07250426.9-1245, 2 pages.

European Patent Office, "European Search Report", European patent application 07250426.9-1245, dated Jun. 12, 2008, 19 pages.

European Patent Office, "European Search Report", application No. EP 09 15 6660, dated Jul. 6, 2009, 7 pages.

(56) References Cited

OTHER PUBLICATIONS

European Patent Office, "Partial European Search Report", European patent application 07250426.9-1245, received Mar. 10, 2008, 5 pages.
U.S. Appl. No. 12/059,916, filed Mar. 31, 2008, Office Action, Mar. 15, 2012.
U.S. Appl. No. 11/656,592, filed Jan. 22, 2007, Final Office Action, Feb. 28, 2012.
U.S. Appl. No. 11/880,359, filed Jul. 20, 2007, Office Action, Apr. 4, 2012.
European Patent Office, "European Search Report", in application No. 09164263.7, dated May 4, 2012, 6 pages.
U.S. Appl. No. 13/363,144, filed Jan. 31, 2012, Office Action, Oct. 17, 2012.
European Patent Office, "Search Report" in application No. 09 156 660.4, dated Sep. 18, 2013, 6 pages.
U.S. Appl. No. 13/753,133, filed Jan. 29, 2013, Final Office Action, Oct. 22, 2013.
U.S. Appl. No. 13/633,046, filed Oct. 1, 2012, Final Office Action, Nov. 1, 2013.
U.S. Appl. No. 12/059,836, filed Mar. 31, 2008, Office Action, Oct. 29, 2013.
U.S. Appl. No. 12/059,916, filed Mar. 31, 2008, Final Office Action, Nov. 4, 2013.
European Patent Office, "Office Action" in application No. 07 252 112.3-1959, dated Nov. 28, 2013, 5 pages.
U.S. Appl. No. 13/363,144, filed Jan. 31, 2012, Notice of Allowance, Feb. 1, 2013.
U.S. Appl. No. 12/166,999, filed Jul. 2, 2008, Final Office Action, Jan. 3, 2013.
U.S. Appl. No. 11/411,248, filed Apr. 25, 2006, Office Action, May 14, 2010.
U.S. Appl. No. 11/439,796, filed May 23, 2006, Notice of Allowance, Jun. 8, 2010.
U.S. Appl. No. 11/656,592, filed Jan. 22, 2007, Office Action, Jul. 26, 2010.
U.S. Appl. No. 11/411,248, filed Apr. 25, 2006, Final Office Action, Oct. 27, 2010.
U.S. Appl. No. 11/656,592, filed Jan. 22, 2007, Final Office Action, Nov. 22, 2010.
U.S. Appl. No. 11/788,517, filed Apr. 20, 2007, Office Action, Jan. 10, 2011.
U.S. Appl. No. 12/059,836, filed Mar. 31, 2008, Office Action, Jan. 21, 2011.
U.S. Appl. No. 12/166,741, filed Jul. 2, 2008, Office Action, May 26, 2011.
U.S. Appl. No. 11/656,592, filed Jan. 22, 2007, Office Action, Jul. 21, 2011.
U.S. Appl. No. 11/788,517, filed Apr. 20, 2007, Notice of Allowance, Jun. 21, 2011.
U.S. Appl. No. 11/880,359, filed Jul. 20, 2007, Restriction Requirement, Jul. 1, 2011.
U.S. Appl. No. 12/059,836, filed Mar. 31, 2008, Final Office Action, Jul. 7, 2011.
U.S. Appl. No. 12/166,741, filed Jul. 2, 2008, Notice of Allowance, Sep. 22, 2011.
U.S. Appl. No. 12/368,168, filed Feb. 9, 2009, Notice of Allowance, Oct. 7, 2011.
U.S. Appl. No. 11/880,359, filed Jul. 20, 2007, Final Office Action, Nov. 29, 2011.
U.S. Appl. No. 13/396,401, filed Feb. 14, 2012, Office Action, May 7, 2012.

* cited by examiner

APPROACH FOR PRINTING POLICY-ENABLED ELECTRONIC DOCUMENTS USING LOCKED PRINTING AND A SHARED MEMORY DATA STRUCTURE

RELATED APPLICATION DATA

This application is related to U.S. patent application Ser. No. 12/059,836 entitled APPROACH FOR PRINTING POLICY-ENABLED ELECTRONIC DOCUMENTS USING LOCKED PRINTING, filed Mar. 31, 2008; U.S. patent application Ser. No. 12/059,916 entitled APPROACH FOR PROCESSING PRINT DATA USING PASSWORD CONTROL DATA, filed Mar. 31, 2008; U.S. patent application Ser. No. 12/166,741 entitled LOCKED PRINT AND DOCUMENT POLICY MANAGEMENT SYSTEM, filed Jul. 2, 2008; U.S. patent application Ser. No. 11/439,796 entitled REMOTE STORED PRINT JOB RETRIEVAL, filed May 23, 2006; U.S. patent application Ser. No. 11/411,248 entitled APPROACH FOR IMPLEMENTING LOCKED PRINTING WITH REMOTE UNLOCK ON PRINTING DEVICES, filed Apr. 25, 2006; U.S. patent application Ser. No. 11/346,479 entitled APPROACH FOR IMPLEMENTING LOCKED PRINTING ON PRINTING DEVICES, filed Feb. 1, 2006; U.S. patent application Ser. No. 11/656,592 entitled FAULT TOLERANT PRINTING SYSTEM, filed Jan. 22, 2007; U.S. patent application Ser. No. 11/788,517 entitled APPROACH FOR IMPLEMENTING LOCKED PRINTING WITH UNLOCK VIA A KEYPAD, filed Apr. 20, 2007; and U.S. patent application Ser. No. 11/880,359 entitled APPROACH FOR PROCESSING PRINT JOBS ON PRINTING DEVICES, filed Jul. 20, 2007, the contents all of which are incorporated by reference in their entirety for all purposes as if fully set forth herein.

FIELD OF THE INVENTION

This invention relates generally to printing of electronic documents.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

The proliferation of communications networks, and in particular the Internet, has raised growing concerns about the security of information transmitted over networks. Numerous protection schemes have been implemented to secure electronic documents transmitted over the Internet, ranging from simple passwords to strong encryption. Policy-based solutions have also been developed that allow business organizations to control access to electronic documents. An electronic document for which the access thereto is controlled using a policy is referred to hereinafter as "policy-enabled document." A policy defines the conditions under which a user is granted access to an electronic document. For example, a policy might specify that particular users are allowed access to the electronic document. Alternatively, the policy might specify that all users on a particular project, or all users at a specified level or higher within a business organization, may access the electronic document.

When a user attempts to open the electronic document through an application, the application prompts the user for user credentials, typically in the form of a user ID and password. The user credentials are authenticated to verify the user. Then, the credentials are provided to a policy server along with data that identifies the electronic document that the user is attempting to access. The policy server retrieves a policy associated with the electronic document and then determines, based upon the policy, whether the user should be allowed to access the electronic document. The policy server returns data to the application that indicates whether the user is allowed to access the electronic document. The application selectively allows the user access to the electronic document based upon the data provided by the policy server.

One of the main benefits of the policy-based approach is that the access rights for any number of electronic documents may be changed by changing single policy, without having to change each of the electronic documents. For example, a business organization may change a single policy for a product that may affect access to a hundreds or even thousands of electronic documents.

One of the limitations of using policies to control access to electronic documents is that once a user has been granted access to an electronic document, the electronic document may be distributed to and accessed by other users, either in electronic or printed form. For example, once a user has been granted access to a policy-enabled electronic document and printed the document, third parties may access the printed document, with or without the consent of the user. Thus, policy-based solutions do not provide control over electronic documents once they have been printed, which can be a significant problem for documents containing sensitive information. Based on the foregoing, there is a need for an approach for controlling access to electronic documents that does not suffer from limitations of prior approaches.

SUMMARY

An approach is provided for printing policy-enabled electronic documents using locked printing and a shared memory data structure. A printing device includes a user interface, a shared memory, a locked print module, a policy client module and a PDF-to-postscript conversion module. When PDF print data is received by a printing device, the locked print module determines whether an electronic document contained in the PDF print data is a policy-enabled electronic document. If so, then the locked print module causes the PDF print data to be stored on the printing device and not immediately processed for printing. In response to both successfully verifying a user and a request to print the electronic document via a user interface at the printing device, the locked print module designates the PDF print data as available for processing. The PDF-to-postscript conversion module retrieves the PDF print data and generates a request for security data for the PDF print data. The PDF-to-postscript conversion module stores the request in a common data structure in the shared memory. The policy client module retrieves the request from the common data structure in the shared memory and obtains security data for the PDF print data from a policy server. The policy client module stores the security data in the common data structure in the shared memory. The PDF-to-postscript conversion module retrieves the security data for the PDF print data from the common data structure in the shared memory and uses the security data to decrypt the PDF print data and generate decrypted PDF data. The PDF-to-postscript conversion module then converts the decrypted PDF print data into postscript data for printing by the printing device.

BRIEF DESCRIPTION OF THE DRAWINGS

In the figures of the accompanying drawings like reference numerals refer to similar elements.

DETAILED DESCRIPTION

Figure 1:
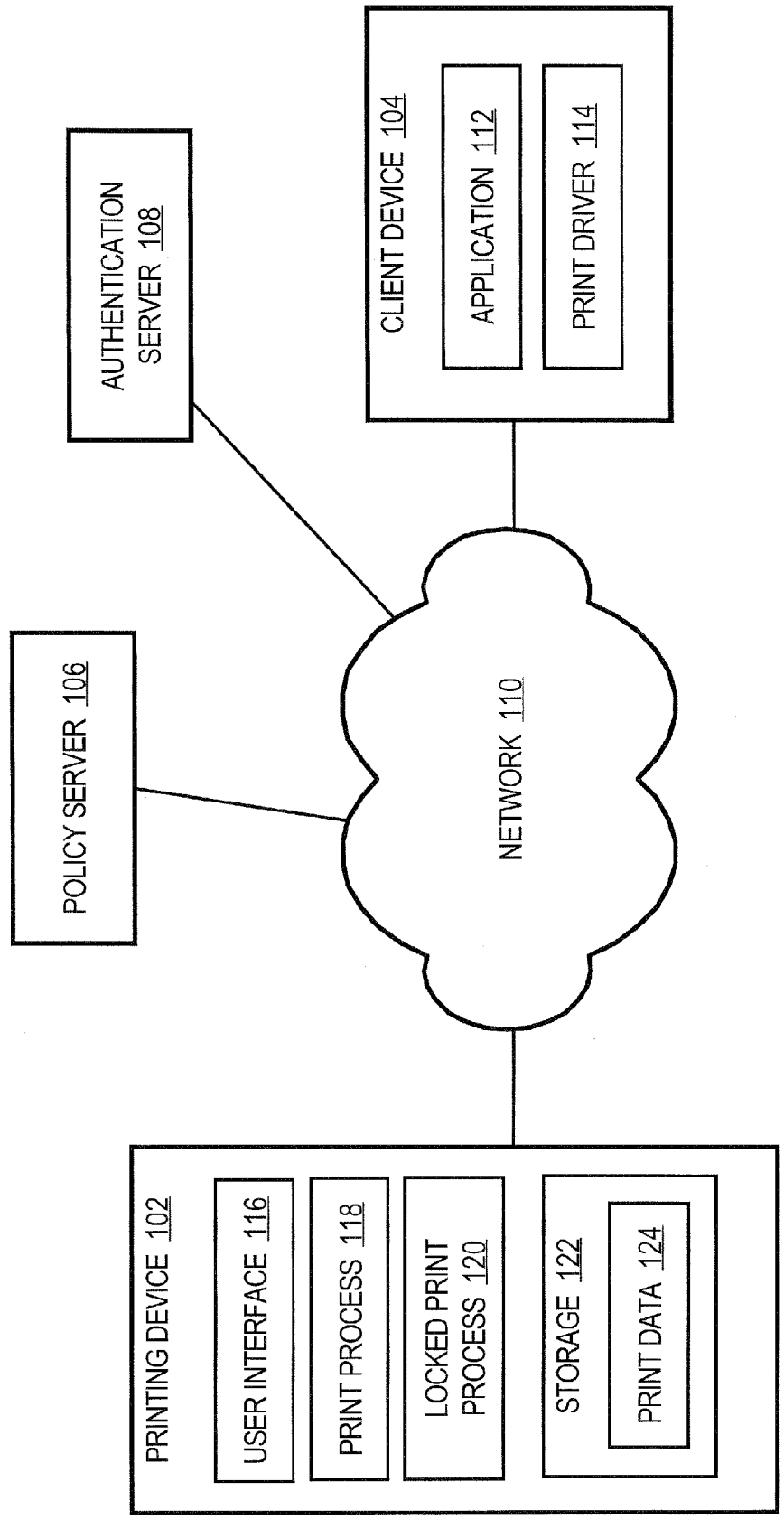
FIG. 1 is a block diagram that depicts an arrangement for printing policy-enabled electronic documents using locked printing and a shared memory data structure according to an embodiment of the invention.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ARCHITECTURE OVERVIEW
III. ARCHITECTURE FOR PRINTING POLICY-ENABLED ELECTRONIC DOCUMENTS USING LOCKED PRINTING AND A SHARED MEMORY DATA STRUCTURE
IV. PROCESS FOR PRINTING POLICY-ENABLED ELECTRONIC DOCUMENTS USING LOCKED PRINTING AND A SHARED MEMORY DATA STRUCTURE
V. MESSAGE STRUCTURES
VI. IMPLEMENTATION MECHANISMS

I. Overview

An approach is provided for printing policy-enabled electronic documents using locked printing and a shared memory data structure. A printing device includes a user interface, a shared memory, a locked print module, a policy client module and a PDF-to-postscript conversion module. When PDF print data is received by a printing device, the locked print module determines whether an electronic document contained in the PDF print data is a policy-enabled electronic document. If so, then the locked print module causes the PDF print data to be stored on the printing device and not immediately processed for printing. In response to both successfully verifying a user and a request to print the electronic document via a user interface at the printing device, the locked print module designates the PDF print data as available for processing. The PDF-to-postscript conversion module retrieves the PDF print data and generates a request for security data for the PDF print data. The PDF-to-postscript conversion module stores the request in a common data structure in the shared memory. The policy client module retrieves the request from the common data structure in the shared memory and obtains security data for the PDF print data from a policy server. The policy client module stores the security data in the common data structure in the shared memory. The PDF-to-postscript conversion module retrieves the security data for the PDF print data from the common data structure in the shared memory and uses the security data to decrypt the PDF print data and generate decrypted PDF data. The PDF-to-postscript conversion module then converts the decrypted PDF print data into postscript data for printing by the printing device.

This approach allows policy-enabled electronic documents to be printed remotely but manages the print data on printing devices as locked print data to provide improved control. The use of locked printing for policy-enabled electronic documents ensures that users are present at a printing device when the policy-enabled documents are printed. Furthermore, the approach is compatible with existing locked printing and policy-based solutions for controlling access to electronic documents.

II. Architecture Overview

FIG. 1 is a block diagram that depicts an arrangement 100 for printing policy-enabled electronic documents using locked printing and a shared memory data structure according to an embodiment of the invention. Arrangement 100 includes a printing device 102, a client device 104, a policy server 106 and an authentication server 108, communicatively coupled via a network 110.

Printing device 102 may be implemented by any type of device that is capable of processing print data and generating printed versions of electronic documents reflected in the print data. In example arrangement 100, printing device 102 includes a user interface 116, a print process 118, a locked print process 120 and storage 122. Printing device 102 may be configured with other mechanisms, processes and functionality, depending upon a particular implementation, and the approach described herein for printing policy-enabled documents on a printing device using locked printing is not limited to any particular type of printing device 102. For example, printing device 102 may be a multi-function peripheral (MFP) that includes any combination of printing, copying, facsimile and scanning capability, etc.

User interface 116 may be any mechanism and/or medium that provides for the exchange of information between a user and printing device 102. Examples of user interface 116 include, without limitation, a control panel with a display and keypad or keyboard, a cathode ray tube (CRT), a liquid crystal display (LCD), a keyboard, touchpad, mouse, trackball, a microphone and speakers, and any combination thereof. Printing device 102 may be configured to display information on user interface 116 in any number of languages, depending upon a particular implementation. As with conventional printing devices, the user interface 116 on printing device 102 may provide limited capability to easily enter alphanumeric strings.

Print process 118 may be implemented by one or more processes for processing print data received from client device 104 and for generating a printed version of an electronic document reflected in the print data. Print process 118 and locked print process 120 may be implemented as resident processes on printing device 102. Alternatively, print process 118 and locked print process 120 may be made available to printing device 102 on a removable media or may be implemented at a remote location with respect to printing device 102. Locked print process may be implemented by one or more processes for providing locked print services on printing device 102.

Storage 122 may be implemented by any type of storage, including volatile storage, non-volatile storage, or any combination of volatile and non-volatile storage. Examples of storage 122 include, without limitation, random access memory (RAM) and one or more disks.

User interface 116, print process 118, locked print process 120 and storage 122 may be implemented in hardware, software, or any combination of hardware or software, depending upon a particular implementation.

Client device 104 may be implemented by any type of client device. Example implementations of client device 104 include, without limitation, workstations, personal computers, laptop computers, personal digital assistants (PDAs), cellular telephony devices and any type of mobile devices. In the example arrangement depicted in FIG. 1, client device 104 is configured with an application 112 and a print driver 114. Application 112 may be any type of application process. Examples of application 112 include, without limitation, a word processor, a spreadsheet program and an email client. Print driver 114 is configured to provide a user interface for a user to specify that locked printing is to be used to print particular print data. Print driver 114 is also configured to process data from application 112 and generate print data that is provided to printing device 102 for processing. Thus, application 112 and print driver 114 operate together to generate and provide print data to printing device 102. Client device 104 may be configured with other mechanisms, processes and functionality, depending upon a particular implementation.

Policy server 106 is an entity that is capable of determining, based upon a policy, whether a user is authorized to print an electronic document. For example, given a user ID, password and identification of an electronic document, policy server 106 is able to determine whether, based upon a policy, the user is authorized to print the electronic document. Authentication server 108 is an entity that is capable of authenticating a user. For example, authentication server 108 may be configured to determine whether a user ID and password pair match any of a set of User ID and password pairs stored on authentication server 108 and provide a message or other corresponding indication.

Network 110 may be implemented by any type of medium and/or mechanism (wired or wireless) that facilitates the exchange of information between client device 104, printing device 102 and client device 104. Furthermore, network 110 may use any type of communications protocol and may be secured or unsecured, depending upon the requirements of a particular application.

Figure 2:
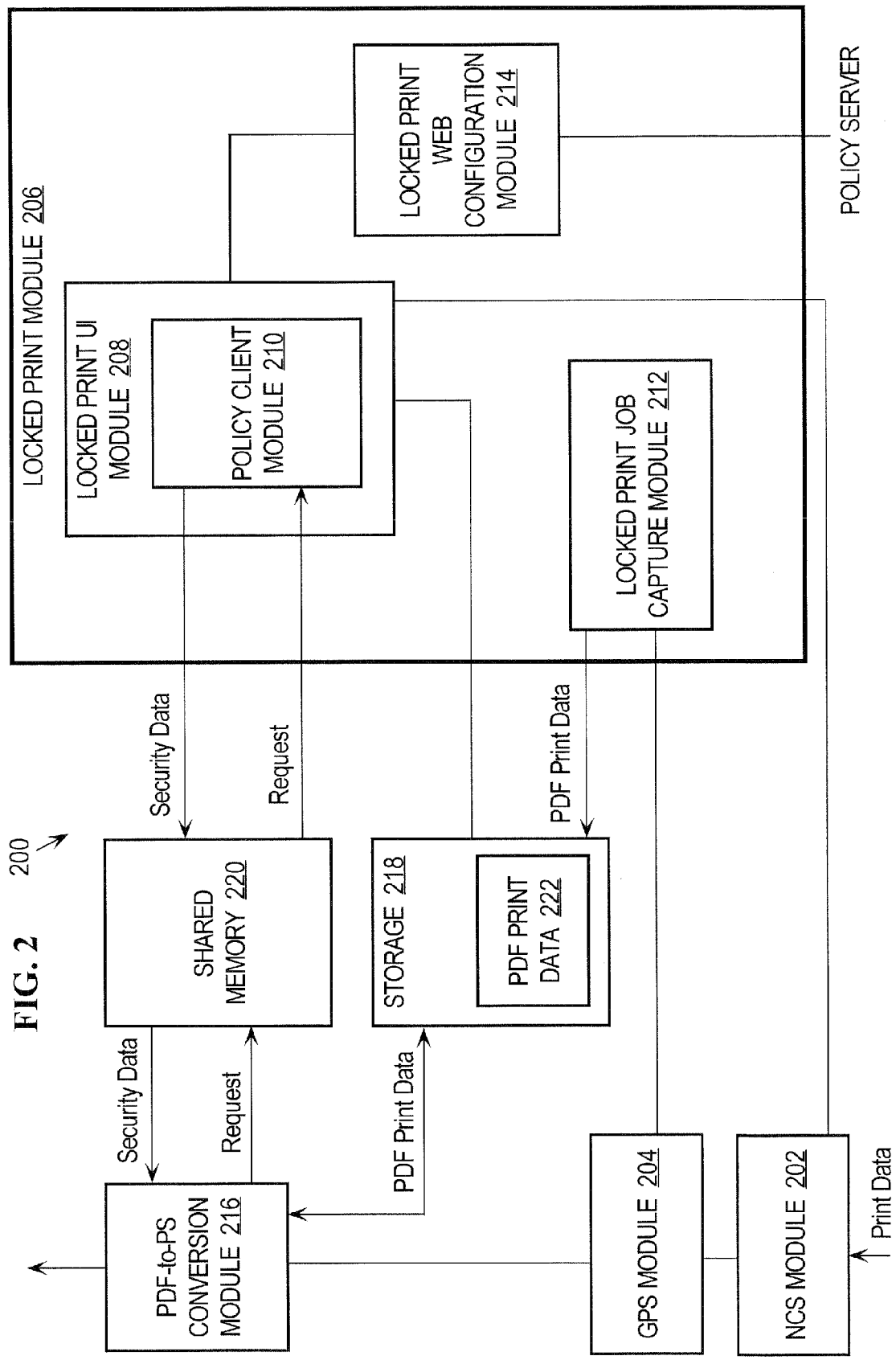
FIG. 2 is a block diagram that depicts an example implementation of an architecture for printing policy-enabled electronic documents using locked printing using a shared memory data structure, according to one embodiment of the invention.

III. Architecture for Printing Policy-Enabled Electronic Documents Using Locked Printing and a Shared Memory Data Structure FIG. 2 is a block diagram that depicts an example implementation of an architecture 200 for printing policy-enabled electronic documents using locked printing using a shared memory data structure, according to one embodiment of the invention. A printing device implementing the architecture of FIG. 2 typically includes various other elements, modules and processes that are not depicted in FIG. 2 for purposes of explanation. The architecture 200 includes a Network Control Service (NCS) module 202, a Global Printing System (GPS) module 204 and a locked print module 206. The locked print module 206 includes a locked print UI module 208, a policy client module 210, a locked print job capture module 212 and a locked print Web configuration module 214. The architecture also includes a PDF-to-PS (postscript) conversion module 216, a storage 218 and a shared memory 220. The connections between the various modules and elements depicted in FIG. 2 represent logical and/or physical connections and are not intended to represent the only connections.

The NCS module 202 implements network, centronics, USB data reception daemons. The GPS module 204 is a print system that dispatches received PDF print data to respective PDL interpreters and controls image rendering.

The locked print UI module 208 provides functionality to support user access to locked print jobs via the user interface 116, as described in more detail hereinafter. The policy client module 210 processes requests for security data and obtains the security data from a policy server. The locked print job capture module 212 determines whether PDF print data received by printing device 102 is designated as a locked print job. This may include examining the contents of the PDF print data and/or a header associated with the PDF print data to detect the presence of data that indicates that the print data is a locked print job. If PDF print data received by printing device 102 is not designated as a locked print job, then the PDF print data is processed in the order in which it was received. If PDF print data received by printing device 102 is designated as a locked print job, then the locked print job capture module 200 causes the PDF print data to be stored on storage 218 instead of being immediately processed for printing. Locked print Web configuration module 214 allows a user, such as an administrator, to configure locked print parameters. For example, the locked print Web configuration module 214 may provide a Web-based user interface for an administrator.

PDF-to-PS conversion module 216 is configured to convert PDF print data into postscript data. This may include decrypting PDF print data using security data retrieved from the shared memory 220, as described in more detail hereinafter. Storage 218 and shared memory 220 may each be implemented by volatile memory, non-volatile memory, or any combination of volatile and non-volatile memory. Also, although storage 218 and shared memory 220 are depicted in the figures and described in the context of being separate elements, they may be combined into a single memory module.

Figure 3:
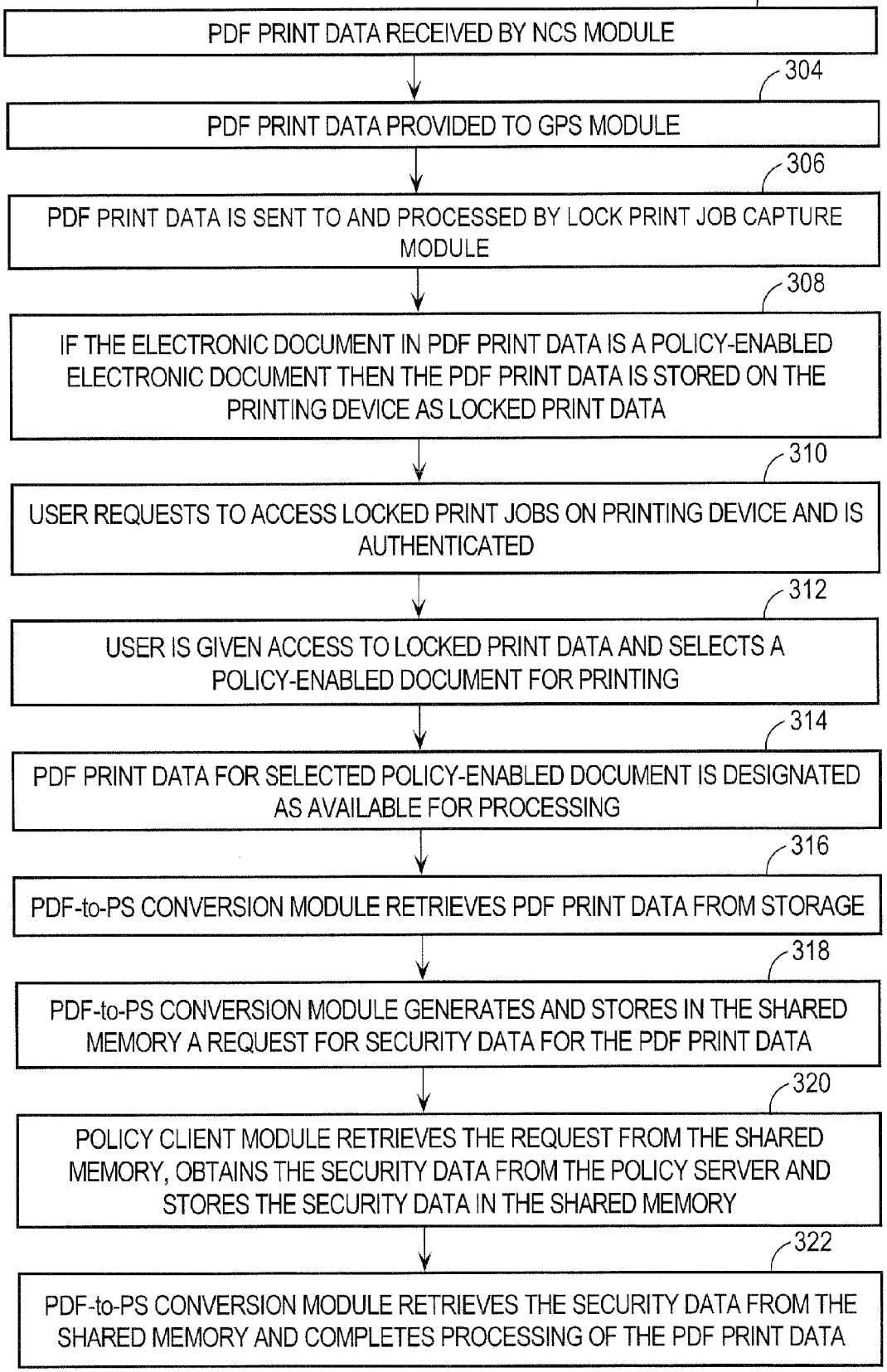
FIG. 3 is a flow diagram that depicts an approach for printing a policy-enabled electronic document using locked printing using a shared memory data structure, according to one embodiment of the invention.

IV. Process for Printing Policy-Enabled Electronic Documents Using Locked Printing and a Shared Memory Data Structure FIG. 3 is a flow diagram 300 that depicts an approach for printing a policy-enabled electronic document using locked printing using a shared memory data structure, according to one embodiment of the invention. In step 302, PDF print data is received by the NCS module 202. In the present example, the PDF print data indicates that the electronic document reflected in the print data is a policy-enabled document. For example, the print data, or a header associated with the print data, may include one or more Print Job Language (PJL) or Page Descriptor Language (PDL) commands that specify that the electronic document is a policy-enabled document.

In step 304, the NCS module 202 provides the PDF print data to the GPS module 204. In step 306, the PDF print data is sent to and processed by the locked print job capture module 212. To cause the print data to be processed by locked print process 120, the print data may be transmitted to a particular port. For example, the printing data may be transmitted to a particular Transport Control Protocol (TCP) port, such as port 9100 or 515 as two possible examples, to cause the locked print job capture module 212 to receive and process the PDF print data. Alternatively, the PDF print data may simply be sent to the printing device and an operating system routine or other routine forwards the print data to locked print process 120 for processing.

The processing of the PDF print data by the locked print job capture module 212 includes determining whether the electronic document contained in the PDF print data is a policy-enabled electronic document. According to one embodiment of the invention, the locked print job capture module 212 examines the PDF print data to determine whether the electronic document reflected in the PDF print data is a policy-enabled electronic document. This may be determined, for example, by the presence of one or more commands or codes in the print data that indicate that the electronic document is a policy-enabled electronic document. The data indicating that an electronic document is a policy-enabled electronic document may be contained in a header portion of the PDF print data, in the body portion of the PDF print data, or any combination of a header portion and body portion of the PDF print data. For example, in some implementations, the application that generates the PDF print data in conjunction with a print driver may create a header that is appended to the PDF print data and the header contains one or more commands that indicate that the electronic document contained in the PDF print data is a policy-enabled electronic document. According to one embodiment of the invention, the presence in the PDF print data of an APSPASSWORD command indicates that the electronic document is a policy-enabled electronic document.

If, in step 308 the locked print job capture module 212 determines that the electronic document contained in the PDF print data is not a policy-enabled electronic document, then the PDF print data is made available for PDF-to-PS module 216 and is processed normally. If, however, the electronic document contained in the PDF print data is a policy-enabled electronic document, then the locked print job capture module 212 causes the PDF print data to be stored on the storage 218, e.g., as PDF print data 222, and managed as locked print data and not immediately processed for printing.

In step 310, a user requests access to locked print jobs stored on the printing device and is authenticated. For example, a user may select a locked print jobs button or icon on user interface 116 to request access to locked print jobs stored on printing device 102. Then the user is queried for user credential data, such as a user ID and password. The user credential data is authenticated. For example, the locked print UI module 208 may be configured to authenticate the user credential data based upon data stored locally on storage 218. This may include, for example, comparing a user ID and password pair specified in the user credential data to a list of verified user ID/password pairs. As another example, a one-way hash function may be used to generate a result based upon the user ID/password pair specified in the authentication data. The result may then be compared to a list of verified results. These are just two examples of how authentication of the user credential data may be performed and the invention is not limited to any particular authentication mechanism or approach. Instead of authenticating the user credential data locally on printing device 102, the user credential data may be authenticated remotely with respect to printing device 102. For example, locked print UI module 208 may cause the user credential data to be transmitted to another location, e.g., authentication server 108 over network 110, for authentication. The locked print UI module 208 receives a return indication from the other location indicating whether the authentication data was verified.

If the user is successfully authenticated, then in step 312, the user is given access to the locked print data and selects a policy-enabled document for printing. For example, a list of locked print jobs associated with the user may be displayed on the user interface 116. Print data may be arranged on the user interface 116, for example, sorted by name or in an order in which the print data was received by printing device 102. The graphical user interface may also include one or more user interface objects that allow a user to select one or more print data to be processed at printing device 102 and one or more actions to be performed on those print data. For example, a user may select a user interface object associated with particular print data and then select a user interface object associated with a printing or deleting function to cause the particular print data to be processed accordingly. Users may be given different types of access to locked print data, depending upon a particular implementation. For example, users may be given access to only the print data that they generated. As another example, users may be given access to all locked print data associated with a logical group, such as a department, project, team, etc. As yet another example, an administrative user may be given access to all locked print data on a printing device so that the administrative user can properly manage the printing device. Access may be based upon the user credential data or other data stored on printing device 102. The user selects a policy-enabled electronic document to be processed and one or more actions to be performed on the print data. In the present example, the user selects a policy-enabled electronic document for printing that is included in PDF print data 222.

In step 314, the locked print UI module 208 designates the selected PDF print data 222 as available for printing. This may include, for example, sending a signal or data to storage 218 to indicate that the PDF print data 222 selected by the user may be processed by PDF-to-PS module 216. The PDF print data 222 may then be "marked" or otherwise indicated as being available for processing. For example, status data may be added to the PDF print data 222 to indicate that the PDF print data is available for processing. As another example, separate status data may be maintained, on storage 218 or elsewhere, for PDF print data stored on storage 218.

In step 316, the PDF-to-PS conversion module 216 detects that the PDF print data 222 is available for processing and retrieves the PDF print data 222 from storage 218. PDF-to-PS conversion module 216 may be configured to periodically check for the existence of PDF print data that is available for processing. Alternatively, PDF-to-PS conversion module 216 may be informed by another process that PDF print data is available for processing.

In step 318, the PDF-to-PS conversion module 216 generates and stores in the shared memory 220 a request for security data for the PDF print data 222. PDF-to-PS conversion module 216 uses the security data to completely process the PDF print data 222. For example, the security data may include decryption data, such as one or more decryption keys, that is used to decrypt a portion or all of the PDF print data 222. The security data may include other information, such as information that indicates one or more policies that apply to the PDF print data 222, as well as information that indicates revocation of rights to the PDF print data 222. According to one embodiment of the invention, the PDF-to-PS conversion module 216 is configured to extract user credential data from the PDF print data 222 and include the user credential data in the request for security data. Examples of the user credential data include, without limitation, a user ID and a password.

In step 320, the policy client module 210 retrieves from the shared memory 220 the request generated and stored by PDF-to-PS conversion module 216. The policy client module 210 processes the request and requests security data from a policy server, such as policy server 106. The policy client module 210 receives the security data that corresponds to the PDF print data 222 and stores the security data in the shared memory 220. In situations where the request includes user credential data, the locked print UI module 208 queries a user for user credential data via the user interface 116. The locked print UI module 208 authenticates the user credential data entered via the user interface 116 against the user credential data contained in the request for security data. For example, a user may be queried for a user ID and password via the user interface 116. The user ID and password entered by the user is compared to a user ID and password stored in the request for security data that were extracted from the PDF print data 222 by the PDF-to-PS conversion module 216.

In step 322, the PDF-to-PS conversion module 216 retrieves the security data from the shared memory 220 and completes processing of the PDF print data 222. This may include, for example, decrypting the PDF print data 222 using decryption data, such as a decryption key contained in, or specified by, the security data. The PDF-to-PS conversion module 216 then converts the decrypted PDF print data into postscript data and the postscript data is printed.

V. Message Structures

Figure 4:
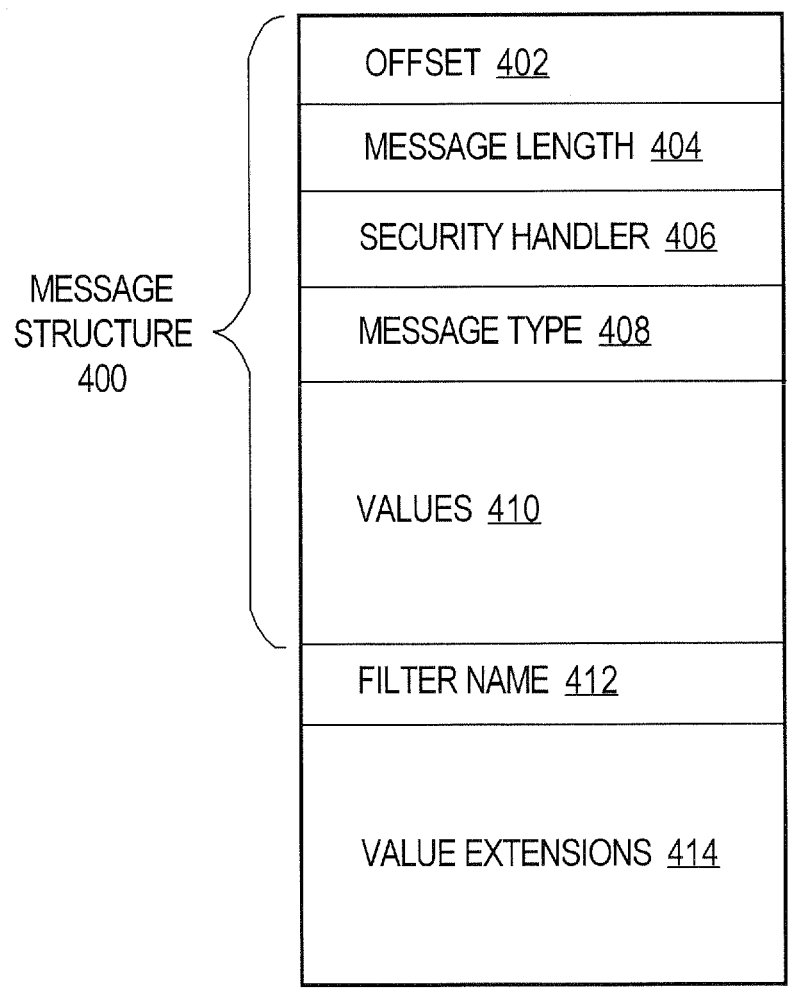
FIG. 4 is a block diagram that depicts an example shared memory message structure, according to one embodiment of the invention.

Messages stored in shared memory 220 may be stored in a wide variety of data structures and formats, depending upon a particular implementation. FIG. 4 is a block diagram that depicts an example shared memory message structure 400, according to one embodiment of the invention. Not all of the attributes depicted in FIG. 4 are required and additional attributes may also be used, depending upon a particular implementation. In the example depicted in FIG. 4, the message structure 400 includes an offset value 402 that indicates the last used location in the shared memory 220. A message length 404 value indicates the size of the values 410. A security handler 406 value indicates an offset of the filter name. The message type 408 value indicates the type of message. The values 410 are the values contained in the message. A filter name 412 and value extensions 414 may be stored with the message structure 400. The filter name 412 is used to indicate whether the corresponding PDF print data is protected by a policy. For example, the filter name 412 may have a value of "Adobe.APS" if the corresponding PDF print data is protected by a policy. Value extensions 414 are additional values that may include, for example, the content that is referenced by a pointer contained in the values 410.

Table I below includes an example pseudo code implementation of a data structure used for messages stored in the shared memory 220. The example message data structure corresponds to the message structure 400 in FIG. 4. The invention is not limited to the example implementation included in Table I, which is provided for purposes of explanation.

TABLE I

```
typedef struct {
    unsigned int offset;        /* Offset of data in shared memory */
    unsigned int mesg_len;      /* #bytes in mesg_data, can be 0 or > 0 */
    unsigned int securityHandler;
    enum {
        Authorize_REQ,
        Authorize_RSP,
        AuthorizeEx_REQ,
        AuthorizeEx_RSP,
        NewAuthData_REQ,
        NewAuthData_RSP,
        GetAuthData_REQ,
        GetAuthData_RSP,
        GetAuthDataEx_REQ,
        GetAuthDataEx_RSP,
        NewSecurityData_REQ,
        NewSecurityData_RSP,
        ValidateSecurityData_REQ,
        ValidateSecurityData_RSP,
        UpdateSecurityData_REQ,
        UpdateSecurityData_RSP,
        NewCryptData_REQ,
        NewCryptData_RSP,
        NewCryptDataEx_REQ,
        NewCryptDataEx_RSP,
        FillEncryptDict_REQ,
        FillEncryptDict_RSP,
        GetSecurityInfo_REQ,
        GetSecurityInfo_RSP,
        FreeSecurityData_REQ,
        FreeSecurityData_RSP,
        FreeAuthData_REQ,
        FreeAuthData_RSP,
        FreeCryptData_REQ,
        FreeCryptData_RSP,
        DisplaySecurityData_REQ,
        DisplaySecurityData_RSP,
        GetReservedData_REQ,
        GetReservedData_RSP,
        GetEncryptAttachmentsFlag_REQ,
        GetEncryptAttachmentsFlag_RSP,
        GetEncryptMethod_REQ,
        GetEncryptMethod_RSP,
        GetErrorInfo_REQ,
        GetErrorInfo_RSP,
        finish_REQ
    } mesg_type;
```

TABLE I-continued

```
    union {
        Authorize_s              Authorize;
        AuthorizeEx_s            AuthorizeEx;
        NewAuthData_s            NewAuthData;
        GetAuthData_s            GetAuthData;
        GetAuthDataEx_s            GetAuthDataEx;
        NewSecurityData_s          NewSecurityData;
        ValidateSecurityData_s          ValidateSecurityData;
        UpdateSecurityData_s          UpdateSecurityData;
        NewCryptData_s           NewCryptData;
        NewCryptDataEx_s           NewCryptDataEx;
        FillEncryptDict_s           FillEncryptDict;
        GetSecurityInfo_s          GetSecurityInfo;
        FreeSecurityData_s          FreeSecurityData;
        FreeAuthData_s           FreeAuthData;
        FreeCryptData_s          FreeCryptData;
        DisplaySecurityData_s           DisplaySecurityData;
        GetReservedData_s           GetReservedData;
        GetEncryptAttachmentsFlag_s           GetEncryptAttachmentsFlag;
        GetEncryptMethod_s           GetEncryptMethod;
        GetErrorInfo_s          GetErrorInfo;
        finish_s         finish;
        } value;
    } Mesg;
```

Figure 5:
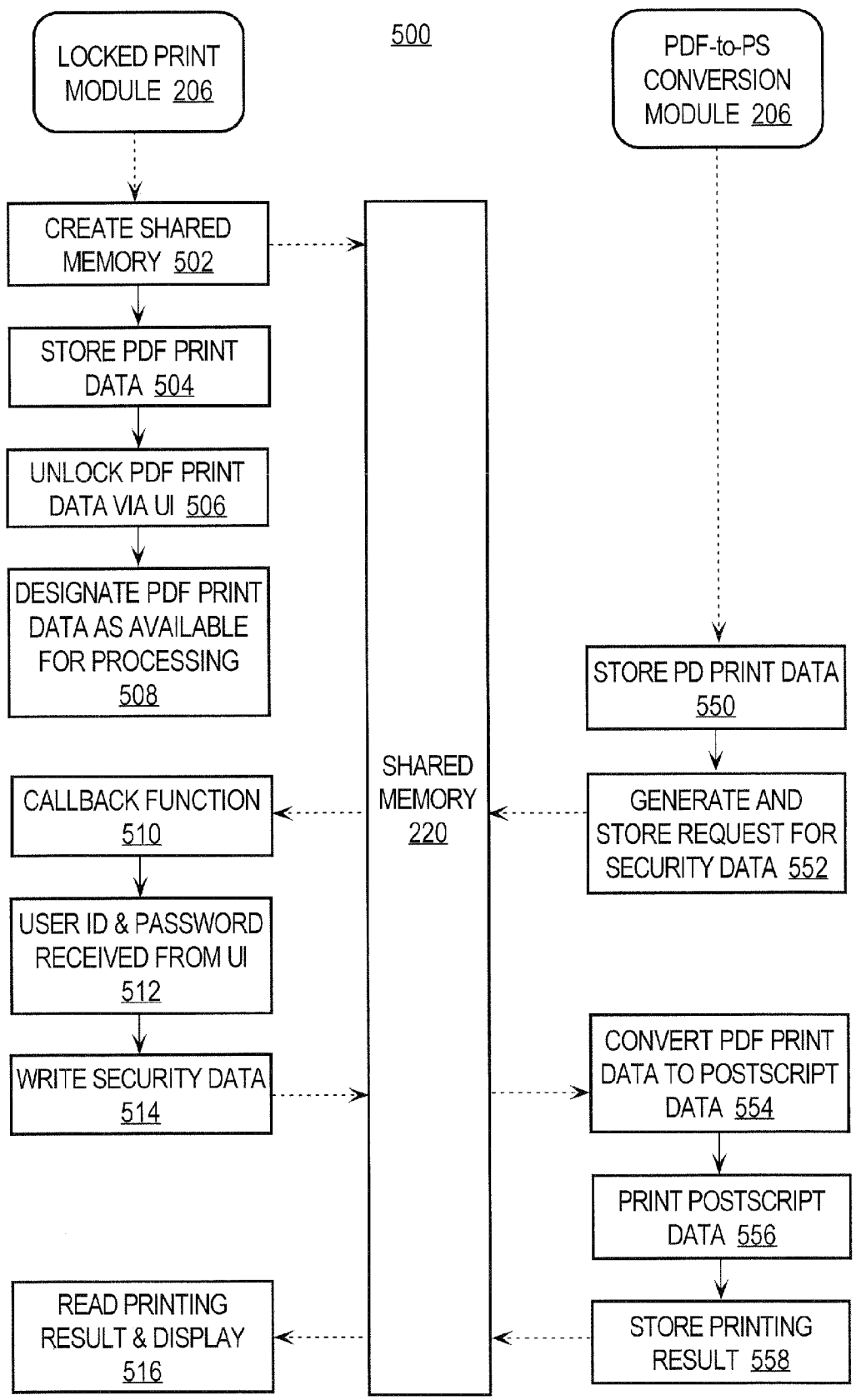
FIG. 5 is a flow diagram that depicts an approach for printing a policy-enabled electronic document using locked printing using a shared memory data structure, according to one embodiment of the invention.

FIG. 5 is a flow diagram 500 that depicts an approach for printing a policy-enabled electronic document using locked printing using a shared memory data structure, according to one embodiment of the invention. In FIG. 5, steps 502-516 are performed by locked print module 206 and steps 550-558 are performed by PDF-to-PS conversion module 206. In step 502, the locked print module 206 creates the shared memory 220. This may be performed, for example, by locked print module 206 allocating a portion of an existing memory or storage. In step 504, the locked print module 206 stores PDF print data 222 into storage 218. The PDF print data 222 may be received by the locked print module 206 from the GPS module 204. In step 506, the PDF print data 222 is unlocked via the user interface 116. As previously described herein, this may include a user accessing the locked print UI module 208 via the user interface 116 to select locked print jobs and then entering user credentials that are verified by the locked print UI module 208. In step 508 the PDF print data is designated as available for processing. This allows PDF-to-PS conversion module 216 to process the PDF print data 222 stored in storage 218. As an alternative to simply designating the PDF print data 222 stored in storage 218 as available for processing, the locked print module 206 may provide the PDF print data 222 to the PDF-to-PS conversion module 216. In this situation, the PDF-to-PS conversion module 216 may directly process the PDF print data 222 or may store the PDF print data into storage 218, for example as depicted by step 550 in FIG. 5.

In step 552, the PDF-to-PS conversion module 216 generates and stores a request for security data into the shared memory 220. The request itself may include security data retrieved from the PDF print data 222. For example, the request may include user credentials, such as a user ID and password, retrieved by the PDF-to-PS conversion module 216 from the PDF print data 222 that were included by a user when the PDF print data 222 was created. According to one embodiment of the invention, the storing of the request into the shared memory 220 initiates a callback function. In response to the callback function, the policy client module 210 processes the request stored in the shared memory 220 by the PDF-to-PS conversion module 216. In step 512, the locked print UI module 208 queries a user for user credential data via the user interface 116. The locked print UI module 208 verifies the user credential data against the security data that was included by the PDF-to-PS conversion module 216 in the request. Assuming this is successful, then the policy client module 210 obtains security data from policy server 106 for the PDF print data 222. In step 514, the policy client module 210 stores the security data received from the policy server 106 into the shared memory 220. According to one embodiment of the invention, the policy client module 210 stores the security data received from the policy server 106 into a shared data structure as previously described herein.

In step 554, the PDF-to-PS conversion module 216 retrieves the security data from the shared data structure stored in the shared memory 220 and coverts the PDF print data 222 to postscript data. This may include decrypting the PDF print data 222 using decryption data, such as a decryption key, or other decoding data, included in the security data that was retrieved by the policy client 210 from the policy server 106. In step 556, the PDF-to-PS conversion module 216 prints the postscript data and in step 558 stores a printing result 558. In step 516, the locked print module 206 reads and displays the printing result.

The prior example illustrates that several levels of security may be employed with the approach for processing policy-enabled electronic documents. First, policy-enabled electronic documents are processed by the printing device 102 as locked print data. This requires that users be authenticated at the printing device 102 before being given access to the policy-enabled electronic documents that have been stored as locked print data. This level of protection is generally implemented at the user-level, i.e., users are given access to certain stored locked print data based upon the verification of user credentials at the printing device 102. Second, each PDF print data may contain additional user credential data that is used to control access to PDF print data on a document-by-document basis. That is, when a PDF document is created, a user ID and password may be associated with that PDF document and the user must correctly enter this information at the printing device 102 before the policy client module 210 will obtain the security data from the policy server 106. Third, the use of policies allows an additional level of control. For example, the policy client module 210 may provide data that indicates the PDF print data 222, along with user credentials to the policy server 106. The policy server 106 applies a policy to this information to determine whether the user should be granted access to the PDF print data 222. If so, the policy server 106 provides the security data to the policy client module 210 as described herein. Otherwise, the policy server 106 may provide data to the policy client module 210 that indicates that the user is not authorized to access the PDF print data 222.

VI. Implementation Mechanisms

The approach described herein for printing policy-enabled electronic documents using locked printing with a shared memory data structure may be implemented using Web Services. For example, printing device 102 may be a Web Services enabled device and support discovery, metadata exchange and event processing functionality.

Figure 6:
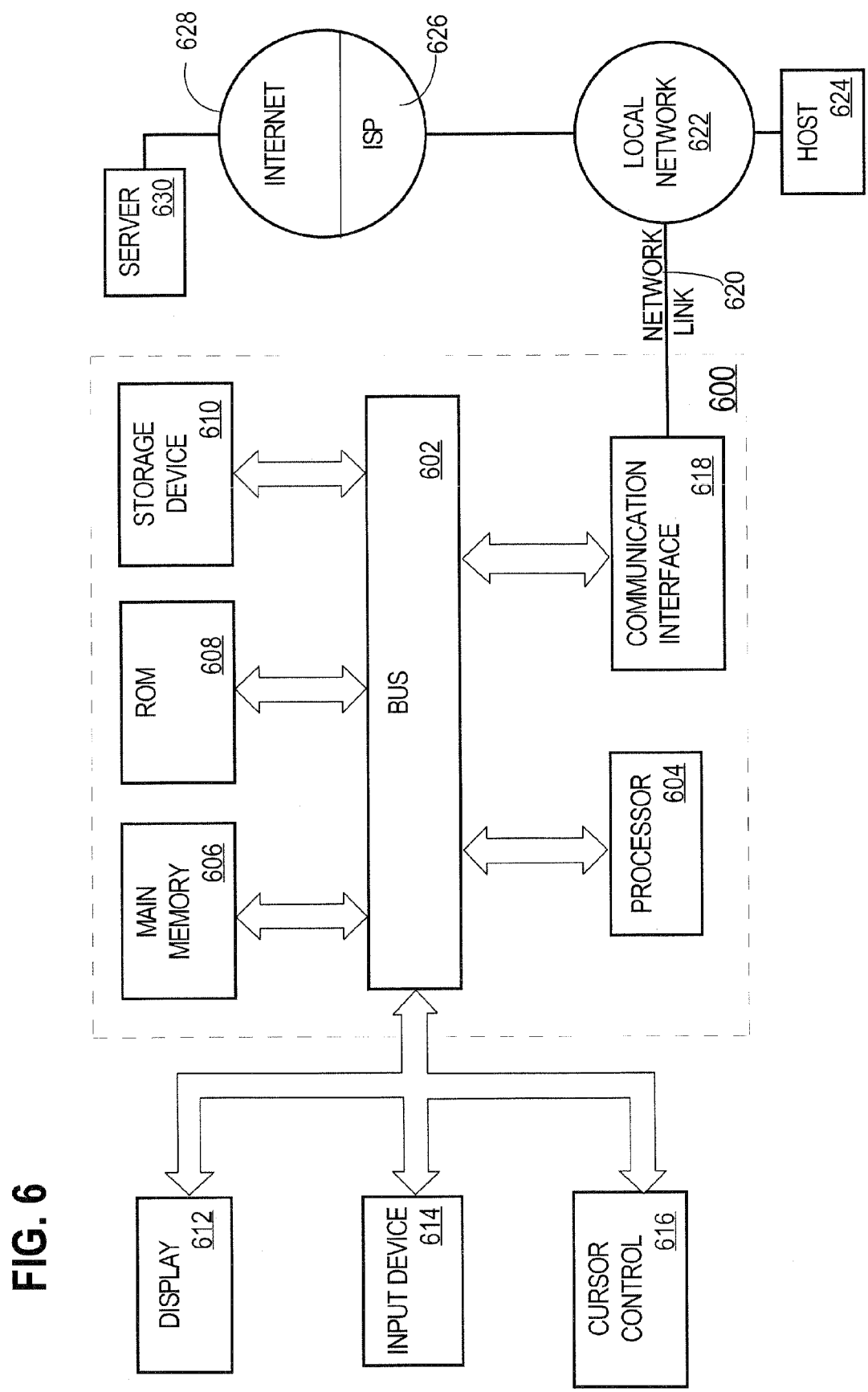
FIG. 6 is a block diagram of a computer system on which embodiments of the invention may be implemented.

The approach described herein for printing policy-enabled electronic documents using locked printing with a shared memory data structure may be implemented on any type of computing platform or architecture. For purposes of explanation, FIG. 6 is a block diagram that depicts an example computer system 600 upon which embodiments of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 600, various computer-readable media are involved, for example, in providing instructions to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printing device comprising:
   a user interface configured to display information to users and receive user input from the users;
   a shared memory;
   a locked print module configured to:
   examine PDF print data received by the printing device to determine whether an electronic document contained in the PDF print data is a policy-enabled document,
   if the electronic document contained in the PDF print data is a policy-enabled document, then cause the PDF print data to be stored at the printing device instead of being processed for printing, and
   in response to both a successful verification of a user and a request to print the electronic document via the user interface at the printing device, designating the PDF print data as available for processing;
   a policy client module configured to:
   retrieve, from the shared memory, a request for security data for the PDF print data,
   based upon the request, retrieve, from a policy server, the security data for the PDF print data, and
   store, in the shared memory, the security data for the PDF print data; and
   a PDF-to-postscript conversion module configured to:
   retrieve the PDF print data stored at the printing device,
   generate, based upon the PDF print data, the request for security data for the PDF print data,
   store the request for the security data for the PDF print data in the shared memory,
   retrieve, from the shared memory, the security data for the PDF print data,
   decrypt the PDF print data to generate decrypted PDF print data, and
   convert the decrypted PDF print data into postscript print data for printing.

2. The printing device as recited in claim 1, wherein the request for security data for the PDF print data and the security data for the PDF print data are stored in a common data structure in the shared memory.

3. The printing device as recited in claim 1, wherein:
   the security data includes decryption data, and
   the PDF-to-PS conversion module is further configured to use the decryption data to decrypt the PDF print data.

4. The printing device as recited in claim 1, wherein:
   the PDF-to-PS conversion module is further configured to:
   extract user credential data from the PDF print data, and
   include the user credential data in the request for security data for the PDF print data, and
   the locked print module is further configured to:
   extract the user credential data from the request for security data for the PDF print data, and
   verify user credential data received from a user via the user interface against the user credential data extracted from the PDF print data.

5. The printing device as recited in claim 1, wherein the locked print module is further configured to examine header data to determine whether the electronic document contained in the PDF print data is a policy-enabled document.

6. The printing device as recited in claim 5, wherein the locked print module is further configured to recognize one or more PJL commands contained in the header data that indicate that the electronic document contained in the PDF print data is a policy-enabled document.

7. The printing device as recited in claim 1, wherein the locked print module is further configured to cause a list of print jobs associated with the user to be displayed on the user interface and select one or more of the print jobs for printing.

8. The printing device as recited in claim 1, wherein the policy client module is further configured to transmit to the policy server both user credential data that uniquely identifies the user and data that identifies the electronic document.

9. A computer-implemented method for processing PDF print data on a printing device, the computer-implemented method comprising:
   a locked print module on the printing device:
   examining PDF print data received by the printing device to determine whether an electronic document contained in the PDF print data is a policy-enabled document,
   if the electronic document contained in the PDF print data is a policy-enabled document, then cause the PDF print data to be stored at the printing device instead of being processed for printing, and
   in response to both a successful verification of a user and a request to print the electronic document via a user interface at the printing device, designating the PDF print data as available for processing;
   a policy client module on the printing device:
   retrieving, from a shared memory, a request for security data for the PDF print data,
   based upon the request, retrieving, from a policy server, the security data for the PDF print data, and
   storing, in the shared memory, the security data for the PDF print data; and
   a PDF-to-postscript conversion module on the printing device:
   retrieving the PDF print data stored at the printing device,
   generating, based upon the PDF print data, the request for security data for the PDF print data,
   storing the request for the security data for the PDF print data in the shared memory,
   retrieving, from the shared memory, the security data for the PDF print data,
   decrypting the PDF print data to generate decrypted PDF print data, and
   converting the decrypted PDF print data into postscript print data for printing.

10. The computer-implemented method as recited in claim 9, wherein the request for security data for the PDF print data and the security data for the PDF print data are stored in a common data structure in the shared memory.

11. The computer-implemented method as recited in claim 9, wherein:
    the security data includes decryption data, and
    the PDF-to-PS conversion module is further configured to use the decryption data to decrypt the PDF print data.

12. The computer-implemented method as recited in claim 9, wherein:
    the PDF-to-PS conversion module is further configured to:
    extract user credential data from the PDF print data, and
    include the user credential data in the request for security data for the PDF print data, and the locked print module is further configured to:
    extract the user credential data from the request for security data for the PDF print data, and verify user credential data received from a user via the user interface against the user credential data extracted from the PDF print data.

13. The computer-implemented method as recited in claim 9, wherein the locked print module is further configured to examine header data to determine whether the electronic document contained in the PDF print data is a policy-enabled document.

14. The computer-implemented method as recited in claim 13, wherein the locked print module is further configured to recognize one or more PJL commands contained in the header data that indicate that the electronic document contained in the PDF print data is a policy-enabled document.

15. The computer-implemented method as recited in claim 9, wherein the locked print module is further configured to cause a list of print jobs associated with the user to be displayed on the user interface and select one or more of the print jobs for printing.

16. The computer-implemented method as recited in claim 9, wherein the policy client module is further configured to transmit to the policy server both user credential data that uniquely identifies the user and data that identifies the electronic document.

17. A non-transitory computer-readable medium for processing PDF print data on a printing device, the non-transitory computer-readable medium storing instructions which, when processed by one or more processors, cause:
a locked print module on the printing device:
examining PDF print data received by the printing device to determine whether an electronic document contained in the PDF print data is a policy-enabled document,
if the electronic document contained in the PDF print data is a policy-enabled document, then cause the PDF print data to be stored at the printing device instead of being processed for printing, and
in response to both a successful verification of a user and a request to print the electronic document via a user interface at the printing device, designating the PDF print data as available for processing;
a policy client module on the printing device:
retrieving, from a shared memory, a request for security data for the PDF print data,
based upon the request, retrieving, from a policy server, the security data for the PDF print data, and
storing, in the shared memory, the security data for the PDF print data; and
a PDF-to-postscript conversion module on the printing device:
retrieving the PDF print data stored at the printing device,
generating, based upon the PDF print data, the request for security data for the PDF print data,
storing the request for the security data for the PDF print data in the shared memory,
retrieving, from the shared memory, the security data for the PDF print data,
decrypting the PDF print data to generate decrypted PDF print data, and
converting the decrypted PDF print data into postscript print data for printing.

18. The non-transitory computer-readable medium as recited in claim 17, wherein the request for security data for the PDF print data and the security data for the PDF print data are stored in a common data structure in the shared memory.

19. The non-transitory computer-readable medium as recited in claim 17, wherein:
the security data includes decryption data, and
the computer-readable medium further carries one or more additional instructions which, when processed by the one or more processors, causes the PDF-to-PS conversion module to use the decryption data to decrypt the PDF print data.

20. The non-transitory computer-readable medium as recited in claim 17, further carrying one or more additional instructions which, when processed by the one or more processors, cause:
the PDF-to-PS conversion module to:
extract user credential data from the PDF print data, and
include the user credential data in the request for security data for the PDF print data, and the locked print module to:
extract the user credential data from the request for security data for the PDF print data, and
verify user credential data received from a user via the user interface against the user credential data extracted from the PDF print data.

21. The non-transitory computer-readable medium as recited in claim 17, further carrying one or more additional instructions which, when processed by the one or more processors, causes the locked print module to examine header data to determine whether the electronic document contained in the PDF print data is a policy-enabled document.

22. The non-transitory computer-readable medium as recited in claim 21, further carrying one or more additional instructions which, when processed by the one or more processors, causes the locked print module to recognize one or more PJL commands contained in the header data that indicate that the electronic document contained in the PDF print data is a policy-enabled document.

23. The non-transitory computer-readable medium as recited in claim 17, further carrying one or more additional instructions which, when processed by the one or more processors, causes the locked print module to cause a list of print jobs associated with the user to be displayed on the user interface and select one or more of the print jobs for printing.

24. The non-transitory computer-readable medium as recited in claim 17, further carrying one or more additional instructions which, when processed by the one or more processors, causes the policy client module to transmit to the policy server both user credential data that uniquely identifies the user and data that identifies the electronic document.

* * * * *